Sept. 20, 1960

J. J. KEARNS 2,953,143

SHIP DECONTAMINATION SYSTEM

Filed June 16, 1954

INVENTOR.
JAMES J. KEARNS

BY

B. L. Zangwill
ATTORNEYS

INVENTOR.
JAMES J. KEARNS

United States Patent Office 2,953,143
Patented Sept. 20, 1960

2,953,143

SHIP DECONTAMINATION SYSTEM

James J. Kearns, 330 Grove Ave., Falls Church, Va.

Filed June 16, 1954, Ser. No. 437,310

1 Claim. (Cl. 134—58)

(Granted under Title 35, U.S. Code (1952), sec. 266)

The invention described herein may be manufactured and used by or for the Government of the United States of America for governmental purposes without the payment of any royalties thereon or therefor.

The present invention relates to radiological contamination countermeasure and more particularly to radiological contamination countermeasure for the weather surfaces of surface vessels to decontaminate such surfaces in the shortest possible time in order to permit immediate reoccupation of stations topside.

Generally, countermeasure for radiological contamination of surface vessels has not been necessary before the advent of the modern atomic era. From tests conducted for the study of atomic explosion, it has been determined that a surface vessel exposed to a nearby sub-surface atomic explosion is exposed to radio-active materials deposited aboard which contaminate the weather surface of the vessels to a possible lethal degree with regards to the personnel situated in their stations topside. Thus, the present invention provides a means of rapidly decontaminating vessels of such radio-active materials to effectively decontaminate all weather surfaces in the shortest possible time to permit the personnel to man their stations topside.

The countermeasure method and means comprise an arrangement and disposition of fluid nozzles on the weather surfaces of surface vessels so placed that an optimum distribution of water or the like over the surfaces is effected as a result of the relative wind speed over the vessel from bow to stern when the vessel is underway. The nozzles are supplied with plain sea water from a piping system and remote control valves taking salt water or the like from the ships conventional fire main which includes pumping means for pumping sea water directly from the sea into the piping system.

The system utilizes the minimum number of nozzles so located as to give maximum coverage per nozzle and still remain within the existing salt water pumping capacity of the specific surface vessel. From the study of underwater atomic explosions it has been determined that the system must be actuated and completely wet down the vessel in less than 30 seconds in order to provide an efficient and effective decontamination of such surfaces to substantially maintain the collective utilization of the vessel against enemy action.

A vessel provided with the washed down countermeasure of the present invention and exposed to an underwater atomic explosion at ranges beyond physical immobilization will be able to completely wet itself down prior to the arrival of the contaminating base surge associated with an underwater nuclear explosion. The present wash down system is provided with remote control stations protectively located topside and provided with a conventional electrical push button system to actuate the entire wash down procedure. The surface vessel exposed to an underwater atomic explosion and provided with the present invention will proceed on a course leading away from the contaminated area while the counter-measure is in operation. Tests have further shown that approximately ten minutes will be required to completely remove all contaminants deposited on board by the base surge of the nuclear explosion. Also, these tests have indicated that the present invention is the only known practicable method of satisfactorily alleviating the contamination hazards incident to a sub-surface nuclear explosion at sea.

Atomic explosion tests have indicated that sub-surface nuclear explosions produce a column of water and spray having a gigantic cloud of mist surrounding the lower portion of said column which formed approximately 10 seconds after detonation and rapidly traveled outwardly. This wall of mist, known as the base surge, is, in effect, a dense cloud of liquid droplets having the property of flowing as a homogeneous fluid. Because of the highly radioactive property of the base surge due to the fission products carried therein, it represents a serious hazard for a distance of several miles.

Thus, this base surge presents a zone of serious hazard to personnel lying beyond the limits of mechanical damage which may provide a lethal trap for all exposed personnel within a radius of substantially one mile and produces a radiation field of serious intensity for approximately three miles to leeward. The operation of a vessel within this zone as a fighting unit is limited to a matter of a few hours, if at all, unless some means of reducing the intensity of the deposited radioactive material effected at once. The practical method of doing this decontamination appears to be the removal of the contaminating material itself.

Additionally certain types of nuclear-weapon detonations, while not creating a typical base-surge effect, nevertheless generate huge contaminating clouds. These are originally visible as mushroom-shaped clouds at very great altitudes which, over varying periods of time, deposit their entrained contaminants over wide sea areas. Thus, contaminants may be delivered aboard ships as a result of transiting a base surge when in close proximity to an underwater detonation or by being subjected to the radioactive fallout from upper-altitude clouds at great distances from the point of detonation.

Tests have indicated that the contaminant or condensate carrying the radioactive particles can be partially flushed over the side, when the flushing water is immediately applied. Further, tests have shown that considerable dilution is obtained with relatively small amounts of sea water if the radioactive mist has not had time to dry out. In accordance therewith, the present invention provides flushing water upon a moments notice to all parts of the weather surface of the vessel to substantially reduce the intensity of the deposited radioactive material to allow immediate occupation of topside stations. The advisability of salt water flushing the weather surface to reduce the radioactivity has been determined from test results which indicate that the radioactivity can be reduced by an appreciable amount if the exposed surfaces are washed down before the contaminated mist has had time to dry. Also, these tests have indicated that the amounts of water required to reduce the radiation field strength to an acceptable level is relatively small, and within the capacity of shipboard pumps when optimum distribution of water is obtained. Further tests have shown that a reduction intensity of the radiation field on contaminated vessels are reduced by approximately 98%.

An example of the effectiveness of the present invention to reduce the intensity of the radiation field is shown by the utilization of actual data accumulated from a target ship used in a sub-surface atomic detonation test at Bikini. The target vessel experienced a deposited dose of about 5000 roentgens (R), and was believed to have been exposed to a total radiation dosage of approximately 10,000 R's. That is, the deposited contamination is believed to contribute only half of the total dosage delivered to the target ship as a result of the base surge phenomenon and that an equal amount is considered to be delivered during the targets transit period. Therefore the total dosage received by the target ship consists of the transit dose and the deposited dose, wherein the transit dose is the radiation received from the mist and fall out while the base surge envelops a ship plus that from the radioactive material entrained in any portion of the water column which may fall near the ship. The deposit dose is the radioactive material deposit upon and retained by the ship. Consequently, the wash down decontamination system of the present invention which is approximately 100% effective in removing the deposited contaminants will reduce the total dosage received by completely exposed personnel by approximately 50%.

Transposing the data obtained from the target ship at Bikini to an analogous situation a fully manned ship still capable of operating and equipped with the present water spray system will reduce the deposited radiation level to an extent that the exposed surfaces would have been habitable within a few minutes, for at least short periods of time. Accordingly, members of the crew who have been shielded against the hazards of the transit dose can man exposed positions at once without undue hazard as the deposited dosage will have been reduced from 5000 R's to less than 100 R's.

In usage, if only portions of the weather surfaces have been effectively flushed, a benefit is gained from the remotely controlled spray system since it will be possible for personnel to venture into decontaminated zones and give individual attention to deck items and adjacent areas that have not been appreciably decontaminated by the initial spray, but which have been kept moist. Thus, the advantage of a water spray system is most obvious since within all areas that have been exposed to the base surge, radiation is emitted from every quarter because any exposed surface might be contaminated and every contaminated surface contributes to the strength of the radiation field and, therefore, to the total body radiation dosage received by an individual. Consequently, not only bulkheads and decks must be flushed but all equipment attached to them for the maximum protection are also flushed.

The present invention in addition to its role as a radiological decontamination process may be utilized in reducing the effects of chemical and biological contamination, in much the same manner as in the decontamination of radiological matter, wherein the spray is applied to all weather deck surfaces in a matter of minutes, since the highest degree of contamination will occur during this time and wherein the habitability of the exposed surfaces is at a minimum. Thus, the remotely controlled water spray system capable of washing the entire topside structure appears to be the most efficient manner of accomplishing such results.

The present invention comprises a system having a piping system using preset nozzles and remote control valves operated from a central point within the ship. The arrangement includes a minimum of nozzles so located as to give maximum coverage per nozzle and provide adequate flushing of the entire weather surface of the vessel within the present pumping capacity of said vessel. This system has the advantages of flushing the contaminating agents over the vessel's side and maintaining all exposed surfaces in a moist condition. Further, personnel will be allowed to operate in exposed areas that otherwise might have been untenable for several hours without flushing said areas.

In various ships, with their variant super structure, the selection of the proper type of spray nozzles, or the like, for particular locations will be determined by the amount of area in a given ship's super structure to be covered by the water spray system to produce efficient radiological decontamination within the total water requirements of the ship's normal pumping capacity.

An object of the present invention is the provision of a wash down system to reduce radiological contamination of vessel's weather surfaces resulting from an underwater atomic explosion.

Another object is to provide means to completely wash the weather surfaces of surface vessels within their existing salt water pumping capacity with a minimum array of properly selected nozzles advantageously placed topside to remove any contaminating medium therefrom.

Still another object is to provide a method and means of taking advantage of the wind speed relative to the ship in distributing wash down water to thereby appreciably reduce the spray nozzle requirements and to improve the spray characteristics greatly over that obtainable under static wind conditions.

An object of the present invention is the provision of the method and means to completely wash the weather surfaces of surface vessels within their existing salt water pumping capacity with a minimum array of suitably selected nozzles appropriately placed topside.

Another object is to provide optimum nozzle locations under various operational situations such as a vessel at anchor, at piers, and underway both ahead and astern at varying speeds.

A further object of the invention is the provision of protective means to prevent the ingress of any contaminating medium within the ventilation systems through a system of remote control ventilation closures.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
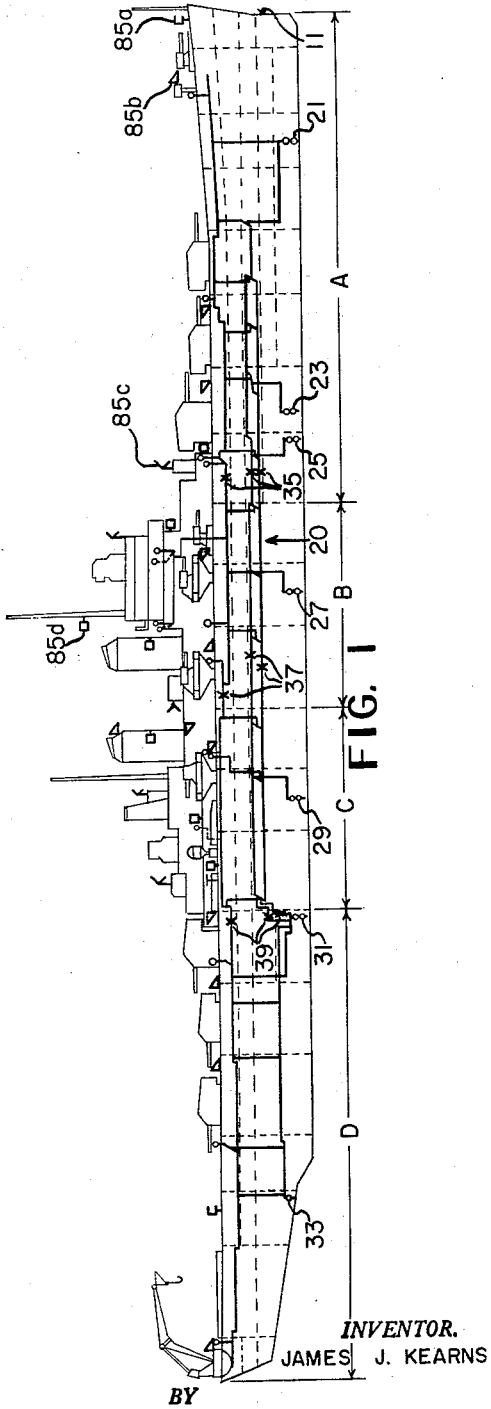
Figure 1 is a side elevational view of a preferred embodiment of the invention showing the location of the weather deck fire plugs and the spray nozzles.

Referring now to the drawings, there is shown in Figure 1 a preferred embodiment comprising a semi-automatic salt water spray system having a plurality of specially selected wash down nozzles secured to suitable locations on the weather surface of the vessel 11, and connected to the vessel's fire main system through hoses and semi-automatic valves so that the entire salt water pumping capacity of the vessel can be delivered to said nozzles on demand by a single push-button control, as hereinafter disclosed.

The conventional naval vessel 11, of the light-cruiser type, is provided with a fire main system 20 having main water pumps 21, 23, 25, 27, 29, 31, and 33. The system 20 is provided with a number of sets of main water valves 35, 37, and 39 to thereby divide the fire main system into four sections A, B, C, and D. Section A consists of pumps 21, 23, and 25 having a total capacity of approximately 2,000 gallons per minute; section B consists of pump 27 with a capacity of approximately 1,000 gallons per minute; section C consists of pump 29 with a capacity of approximately 1000 gallons per minute; and section D with pumps 31 and 33 having a total capacity of approximately 1500 gallons per minute. Thus, the fire main system 20 will consist of four separate sections which can be connected to one another by the simple manipulation of the valves 35, 37, and 39. For example, in a mechanical failure of the pumps in one section, the proper valve or valves can be operated to divert the flow of water from the remaining pumps to the entire fire main system 20.

The fire main system 20 is further provided with deck fire hydrants 41, 43, 45, 47, and 49 supplied by pumps 21, 23, and 25, and suitably distributed over the forward part of the vessel 11 to provide an optimum distribution of salt water on the weather surface and equipment located thereon. Fire hydrants 51, 53, 55, and 57 are supplied by pump 27 to adequately cover the forward portion of the superstructure and the bridge and equipment appertaining thereto. Fire hydrants 59, 61, and 63 are supplied by pump 29 and cover the weather surface amidships and various superstructure paraphernalia secured thereto. Fire hydrants 65, 67, 69, 71 and 73 are supplied by pumps 31 and 33 to cover with an optimum distribution of fluid the stern section of the vessel 11. Each of the deck fire hydrants is provided with suitable quick acting valves 75, such as semi-automatic Globe valves held shut by the pressure of the fire main system 20 and opened by releasing such pressure through the valve's bonnet. The valves 75 are coupled to suitable spray nozzles 85 through interconnecting hoses 77 of suitable strength and size to safely withstand the fire main pressures. The semi-automatic valves 75 are operated on demand by a single push-button control 79 of the electrical control system operatively coupled to the valves.

The electrical control system 78 having terminals 87, coupled to a source of electrical energy, is operatively actuated through a suitable switch, such as a single pole, double throw knife switch 79, a single push-button switch, or the like, to actuate solenoids 81 or 85' to open or close the valves 75. For example, the actuation of the switch 79 to engage the open contact will energize relay 83 closing its contact thereby energizing each opening solenoid 81 as indicated by the arrow thereon. The actuation of each opening solenoid 81 will operate its associated quick acting valve 75 by releasing the fire main pressure through its bonnet in the conventional manner to immediately cause water to flow through the hose 77 to the spray nozzles 85. The actuation of the switch 79 to engage the close contact will energize relay 83' to energize each closing solenoid 85' to close the associated valve 75 by stopping the escape of fire main pressure through the bonnet thereon. The spray nozzles 85 may be of such well-known types as rotating water fog-nozzles, fog foam-nozzles, or the like, or if deemed desirable for the particular installation at hand, sprinkler pipes utilized in a straight run, or a suitable combination of such various conventional spray nozzles to provide the optimum spray distribution for the particular installation. In the preferred embodiment for the purpose of illustration, the spray nozzles 85 consist of a ½-inch Y-shaped dual-head nozzle illustrated throughout the drawings by a symbol indicated by 85a; a ⅝-inch single-head nozzle illustrated by a smybol indicated by 85b; a ⅝-inch Y-shaped dual-head nozzle illustrated by a symbol indicated by 85c; and a ½-inch single-head nozzle illustrated by a symbol indicated by 85d.

Figure 2:
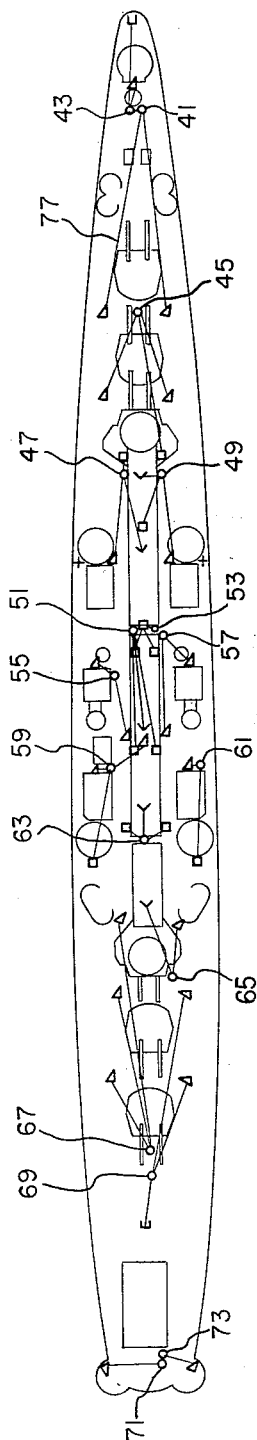
Figure 2 is a plan view of the apparatus shown in Figure 1 and showing the relative location of the weather deck fire plugs and the spray nozzles to the weather deck equipment and structure.
Figure 3:
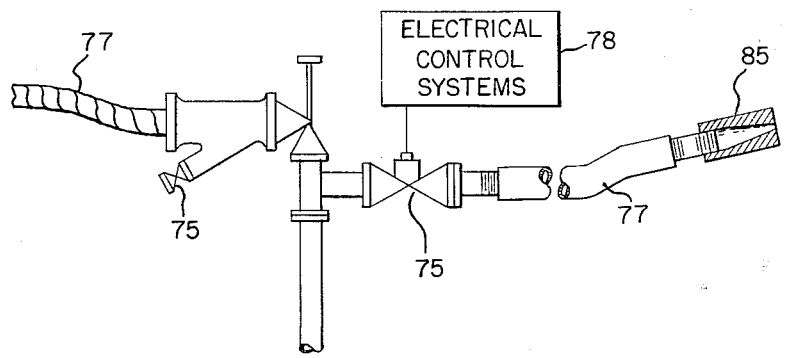
Figure 3 is a schematic view of a spray nozzle connected to a fire main riser with the remote controls coupled thereto.
Figure 4:
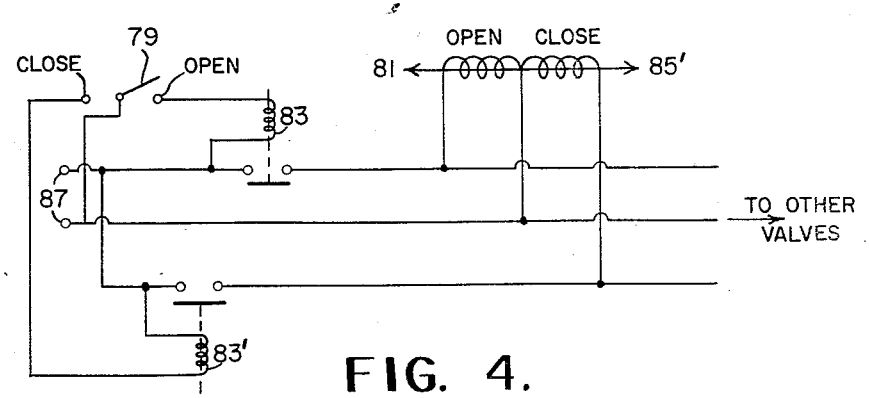
Figure 4 is a simplified wiring diagram illustrating the control system for the spray nozzles.

The spray nozzles 85 are preset in their specific location on the weather surface of the vessel 11, as indicated in Figures 1 and 2, as determined by the particular location to be operatively flushed. Also, the specific size and type of spray nozzle utilized will vary with the installation, as discussed heretofore, wherein a particular installation may require a rotating type of spray nozzle, as on ship masts and exhaust stacks, or the utilization of a single-head spray nozzle. Thus, in the preferred embodiment, the nozzles 85 are so located on the vessel's weather surface as to be effective with various relative wind velocities for the specific type of vessel involved. The nozzle locations are determined therefore by an analysis of the areas of major interest, and the estimated effects of configuration of superstructure on said nozzle location.

In addition, semi-automatic vent closures fitted to the ventilation system of the vessel 11 may be utilized to further reduce the contamination resulting from an atomic attack. The fitting of vent closures on the ventilation system appears to be a most practicable radiological decontamination measure for preventing critical exposure of ships personnel, in conjunction with the spray nozzles strategically located on the weather surface of the vessel. The vent-closures can be operated simultaneously with the spray nozzles 85, or may be actuated by a duplicate of the system 78.

In the operation of the preferred embodiment, the single switch 79, located in a convenient and protected location on the vessel, such as the bridge, will be manipulated to the open position when the ship is exposed to an underwater atomic explosion, at ranges beyond complete physical immobilization, to completely wet-down the vessel 11 prior to the arrival of the contaminating base surge associated with the underwater nuclear explosion. The vessel will then proceed on a course leading away from the contaminated area while the countermeasure is in operation. It has been found extremely difficult effectively to wash down an entire ship under zero-wind conditions. The number of nozzles must be relatively much greater as compared to those required for wash-down while the ship is headed into the wind. Additionally, the pump capacity required under zero-wind easily exceeds the normal pump capacity of the ship, so that the movement of the ship is a vital factor in successful wash-down.

Approximately 10 minutes will be required to completely remove all contaminates delivered on board. Thus, the actuation of the decontaminating system will effectively wash the large weather surface of the vessel and the accompanying intricate gallery structures and equipment to allow the occupation of such structure by the ships personnel within a matter of minutes after the atomic explosion. Also, the weather surface of the vessel will be completely washed down within the existing salt water pumping capacity of the vessel 11 with a minimum array of properly selected spray nozzles advantageously placed topside, and wherein the wind speed over the vessel is advantageously utilized in promoting optimum distribution of wash-down water over said vessel. The advantages derived from the effect of the wind speed in distributing wash-down water is to appreciably reduce nozzle requirements and to greatly improve spray characteristics of said nozzle and thereby eliminating the use of a large amount of equipment to congest the weather surface of the vessel and reduce the retaliating efficiency of the vessel.

The wash-down system of the present invention will provide a rapid decontamination of the weather surfaces of the vessel when exposed to radiological contamination from subsurface atomic explosions; and wherein additional protective means may be utilized through the use of vent-closures to prevent the ingress of the contaminating medium within the weather envelope. The system of remote controlled ventilation closures may be operated through the switch 79, or through an identical electrical control system in conjunction thereto, to close all exhaust and intake ventilation ducts whenever the wash-down system is initially set in operation.

Obviously many modifications and variations of the present invention are possible in the light of the above teachings. It is therefore to be understood, that within the scope of the appended claim, the invention may be practiced otherwise than as specifically described.

What is claimed is:

A semi-automatic spray system for flushing radiological contaminants from a vessel's weather surface comprising a fire protective system on the vessel, said system comprising a pipe system divided into a plurality of sections, each section having a pumping means for drawing sea water from the sea, each of said sections comprising a plurality of fire hydrants, said hydrants being suitably distributed over the weather surface for supplying water thereto, means coupled to said pipe system for maintaining a supply of water to all fire hydrants if some of said pumping means become inoperative, conduit means distributed over said vessel and connected to said pipe system, electrically neutral fog spray means connected to said conduit means for flushing the entire weather surface of the vessel, quick-acting valve means secured to each of said spray means, said spray means being preset relative to the weather surface as to bearing and elevation to thereby distribute a maximum amount of fog spray over the entire weather surface, an electrical control system operatively coupled to said valve means for controlling the communication of water to said spray means, and a single electrical switch remotely situated relative to said spray means for instant actuation of said electrical control system.

References Cited in the file of this patent

UNITED STATES PATENTS

| | | |
|---|---|---|
| 1,991,807 | Kriechbaum | Feb. 19, 1935 |
| 2,085,916 | Marra | July 6, 1937 |
| 2,157,817 | Crago | May 9, 1939 |
| 2,563,587 | De Ment | Aug. 7, 1951 |
| 2,595,774 | De Ment | May 6, 1952 |
| 2,695,976 | Hasenkamp | Nov. 30, 1954 |

OTHER REFERENCES

Abstract of application Serial No. 791,074, by De Ment, filed Dec. 11, 1947, published June 24, 1952, vol. 659, page 1105, O.G., June 24, 1952.

Abstract of application Serial No. 748,632, by De Ment, filed May 16, 1947, published June 24, 1952, vol. 659, page 1104, O.G., June 24, 1952.

"The Effects of Atomic Weapons", U.S. Los Alamos Scientific Laboratory, revised September 1950, pages 320–330.